(12) United States Patent
Shinbo et al.

(10) Patent No.: US 8,197,926 B2
(45) Date of Patent: Jun. 12, 2012

(54) SCREEN

(75) Inventors: Akira Shinbo, Shiojiri (JP); Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 540 days.

(21) Appl. No.: 12/534,420

(22) Filed: Aug. 3, 2009

(65) Prior Publication Data

US 2010/0092734 A1 Apr. 15, 2010

(30) Foreign Application Priority Data

Oct. 15, 2008 (JP) ................................ 2008-266030

(51) Int. Cl.
*G03B 21/60* (2006.01)

(52) U.S. Cl. ........ 428/178; 428/187; 359/454; 359/455; 359/459

(58) Field of Classification Search .................. 428/156, 428/167, 178, 187; 359/454, 455, 459, 619
See application file for complete search history.

(56) References Cited

U.S. PATENT DOCUMENTS 6,167,182 A * 12/2000 Shinohara et al. ............ 385/129

FOREIGN PATENT DOCUMENTS

JP A-2006-215162 8/2006

* cited by examiner

*Primary Examiner* — Catherine A Simone
(74) *Attorney, Agent, or Firm* — Oliff & Berridge, PLC

(57) ABSTRACT

A screen includes a plurality of concave recesses arranged on a flat surface, wherein the recesses are arranged in such a way that the spacing between adjacent ones of the recesses in the radial direction from a reference point located in the flat surface or a plane extended from the flat surface increase with distance from the reference point.

18 Claims, 15 Drawing Sheets

SCREEN

BACKGROUND

1. Technical Field

The present invention relates to a screen, and particularly to a technology of a screen that reflects light projected from a projector.

2. Related Art

A front-projection projector is used in combination with a reflective screen that projects projection light. A reflective screen can relatively easily provide a high-brightness, high-contrast image in a dark-room environment. On the other hand, in a conference room, a room in a general household, and other bright-room environments, the fact that the screen reflects not only image light but also ambient light causes the portion that should be displayed in black to be whitish black in some cases. This phenomenon is called black floating. It is therefore a challenge to provide a high-brightness, high-contrast image on a reflective screen even in bright-room environments. For example, JP-A-2006-215162 proposes a technology in which convex portions having a unit shape are regularly arranged and a reflective portion is provided on each of the unit-shaped portions but only on the portion on which projection light is incident.

In the technology described above, not only is a certain amount of the projection light that is obliquely incident on the screen reflected in the direction of the normal to the screen, but also a large amount of the projection light travels in the direction that forms the same angle as the angle that the incident light and the normal to the screen form (the direction in which the incident light specularly reflected off the screen travels). When the amount of light that travels obliquely to the normal to the screen increases, a viewer in front of the screen disadvantageously views a dim image. As described above, the related art is problematic in that the light unlikely travels in an efficient manner with an appropriate angular distribution in an area in front of the screen.

SUMMARY

An advantage of some aspects of the invention is to provide a screen that causes light from a projector to efficiently travel forward with an appropriate angular distribution so that a high-brightness, high-contrast image is provided.

A screen according to an aspect of the invention includes a plurality of concave recesses arranged on a flat surface, and the recesses are arranged in such a way that the spacings between the recesses in the radial direction from a reference point located in the flat surface or a plane extended from the flat surface increase with distance from the reference point.

On the screen, when the angle of incidence between a normal to the screen and the projection light increases with distance from the reference point, the projection light is incident on a deep portion of the surface of a recess, which is close to the central position thereof, when the recess is close to the reference point. On the other hand, when a recess is far away from the reference point, the projection light is incident on a shallow portion spaced apart from the central position of the recess. When the curvature of each of the recesses is fixed and the recesses are densely arranged, the distance between the centers of adjacent recesses (spacing) is set to a large value in order to provide a satisfactorily large shallow portion of the recess. Considering the above, the projection light can efficiently travel toward an area in front of the screen by more densely arranging the recesses disposed closer to the reference point and increasing the spacing between adjacent recesses in the radial direction from the reference point with distance from the reference point. As a result, light having an appropriate angular distribution can efficiently travel in an area in front of the screen, whereby a high-brightness, high-contrast image can be provided. An example of the case where the angle of incidence between a normal to the screen and the projection light increases with distance from the reference point may be a case where the reference point is located in a position where the optical axis of a projection system intersects the flat surface of the screen or a plane extended from the flat surface.

It is preferable that when a position on the flat surface is defined by the angle between a reference line passing through the reference point and the central point of the flat surface and a straight line passing through the reference point and the position, the recesses are arranged in such a way that the spacing between adjacent ones of the recesses in the radial direction increases as the angle increases. A reflection area in each of the recesses required to provide a satisfactory angular field of view in the horizontal direction is an elongated area in any of the recesses located on the screen. The planar shape of each of the recesses when viewed from the front side of the screen is more inclined as the angle increases. To provide an elongated reflection area when the planar shape of each of the recesses is more inclined, the distance between the centers of adjacent ones of the recesses is increased. Considering the above, the projection light can efficiently travel toward an area in front of the screen by increasing the spacing between adjacent ones of the recesses in the radial direction as the angle increases.

It is preferable that the recesses are arranged on substantially concentric curved tracks around the reference point, and the recesses are arranged with the distance between the curved tracks increasing with distance from the reference point. In this way, the recesses are arranged in such a way that the spacing between adjacent ones of the recesses in the radial direction from the reference point increases.

It is preferable that the recesses are arranged in such a way that the spacing between adjacent ones of the recesses in the direction in which each of the curved tracks extends increases with distance from the reference point. When the recesses are arranged in such a way that the spacing between adjacent ones of the recesses in the radial direction increases as the angle increases, the line perpendicular to the direction in which adjacent recesses are arranged (the direction of the tangential line to the curved track) deviates from the straight line connecting the reference point to the tangent position. The deviation causes the reflection area in each of the recesses required to provide a satisfactory angular field of view to shift from the center of the recess. The amount of shift of the reflection area increases with distance with the reference point. Considering the above, an excellent angular field of view can be provided by increasing the spacing between adjacent recesses in the direction in which each of the curved tracks extends with distance from the reference point.

It is preferable that when a position on the flat surface is defined by the angle between a reference line passing through the reference point and the central point of the flat surface and a straight line passing through the reference point and the position, the recesses are arranged in such a way that the spacing between adjacent ones of the recesses in the direction in which each of the curved tracks extends changes with the angle in order to provide an area in each of the recesses that is required to provide a satisfactory angular field of view.

The reflection area in each of the recesses that is required to provide a satisfactory angular field of view shifts from the center of the recess when the line perpendicular to the direction in which the adjacent recesses are arranged (the direction of the tangential line to the curved track) deviates from the straight line connecting the reference point to the tangent position. The deviation varies with the angular position where the recess is formed. Changing the spacing between adjacent ones of the recesses in the direction in which each of the curved tracks extends in accordance with the angular position where the adjacent recesses are formed can prevent the adjacent recesses from overlapping and hence the reflection area from vanishing.

It is preferable that the recesses are arranged in such a way that the spacing in the direction in which each of the curved tracks extends between the recesses in the position where the angle is approximately 45 degrees is maximized. The shift of the reflection area described above increases as the angle increases from 0 degrees to 45 degrees and decreases as the angle increases toward 180 degrees in many cases. Considering the above, an excellent angular field of view can be provided by increasing the spacing in the direction in which each of the curved tracks extends between the recesses in the position where the angle is approximately 45 degrees.

It is preferable that recesses are further provided between the curved tracks on part of the flat surface. In particular, further providing recesses between the curved tracks in positions where light is incident at a large incident angle between a normal to the screen and the incident light allows the light to be incident on the reflection area in each of the recesses that is required to provide a satisfactory angular field of view.

It is preferable that the central position of each of the recesses irregularly changes from a predetermined reference position in at least one of the radial direction and the direction in which each of the curved tracks extends by the length one-half or smaller than the spacing at which the recesses are arranged. In this way, the degree of a moire pattern can be reduced, whereby a high-quality image can be displayed.

It is preferable that the screen further includes a reflection portion that reflects light, and when projection light is projected under the condition that the optical axis of a projection system substantially coincides with the reference point, the reflection portion is formed on each of the recesses but only in the position on which the projection light is incident. In this way, the projection light can be reflected toward an area in front of the screen.

it is preferable that the screen further includes an absorbing portion that absorbs light incident on the portion of each of the recesses where no reflection portion is formed. Providing the absorbing portion allows the amount of reflection of ambient light incident on the screen to be reduced. In this way, a high-contrast image can be provided.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will be described below in detail with reference to the drawings.

First Embodiment

Figure 1:
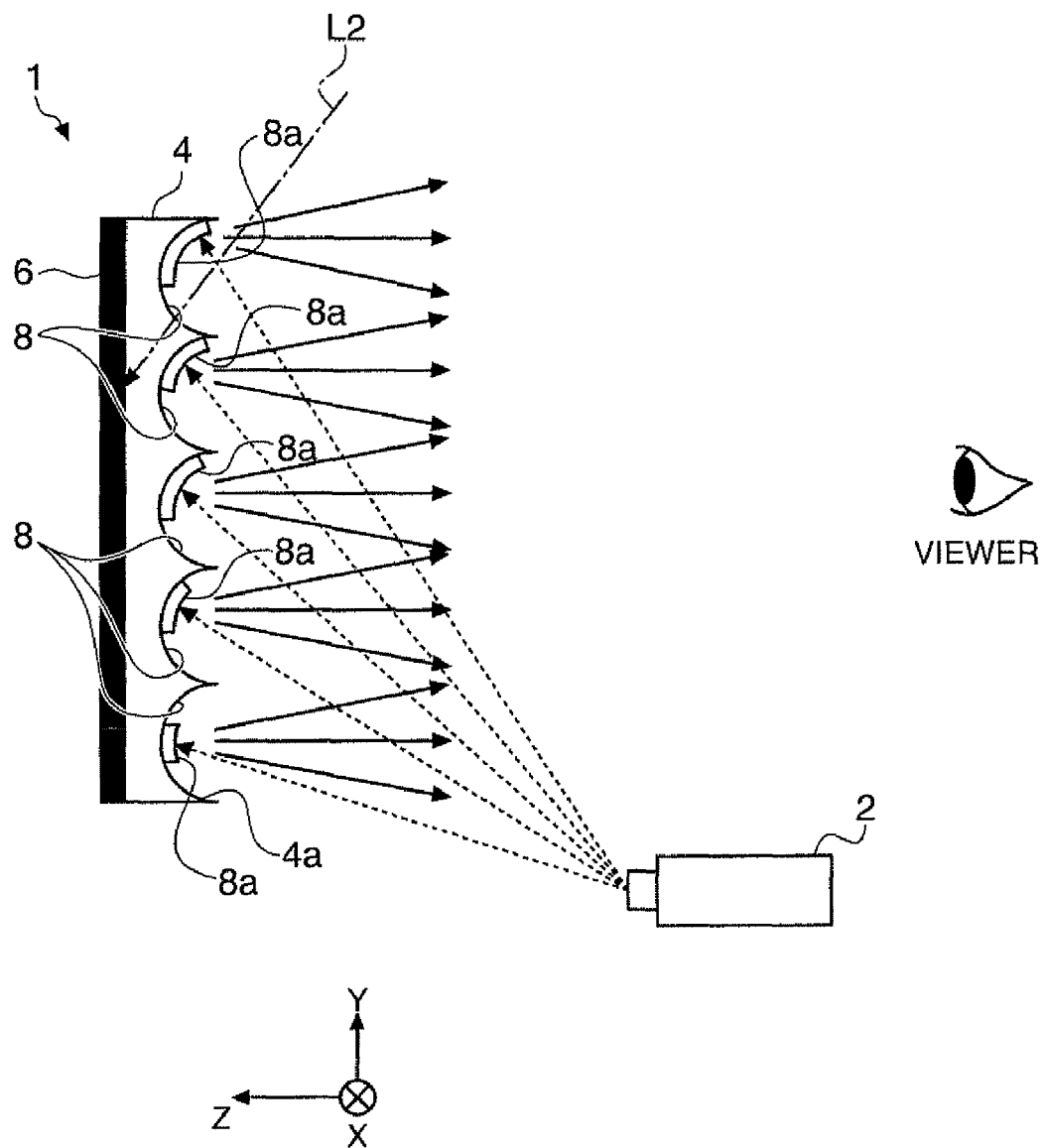
FIG. 1 diagrammatically shows a cross-sectional configuration of a screen according to a first embodiment of the invention.
Figure 2:
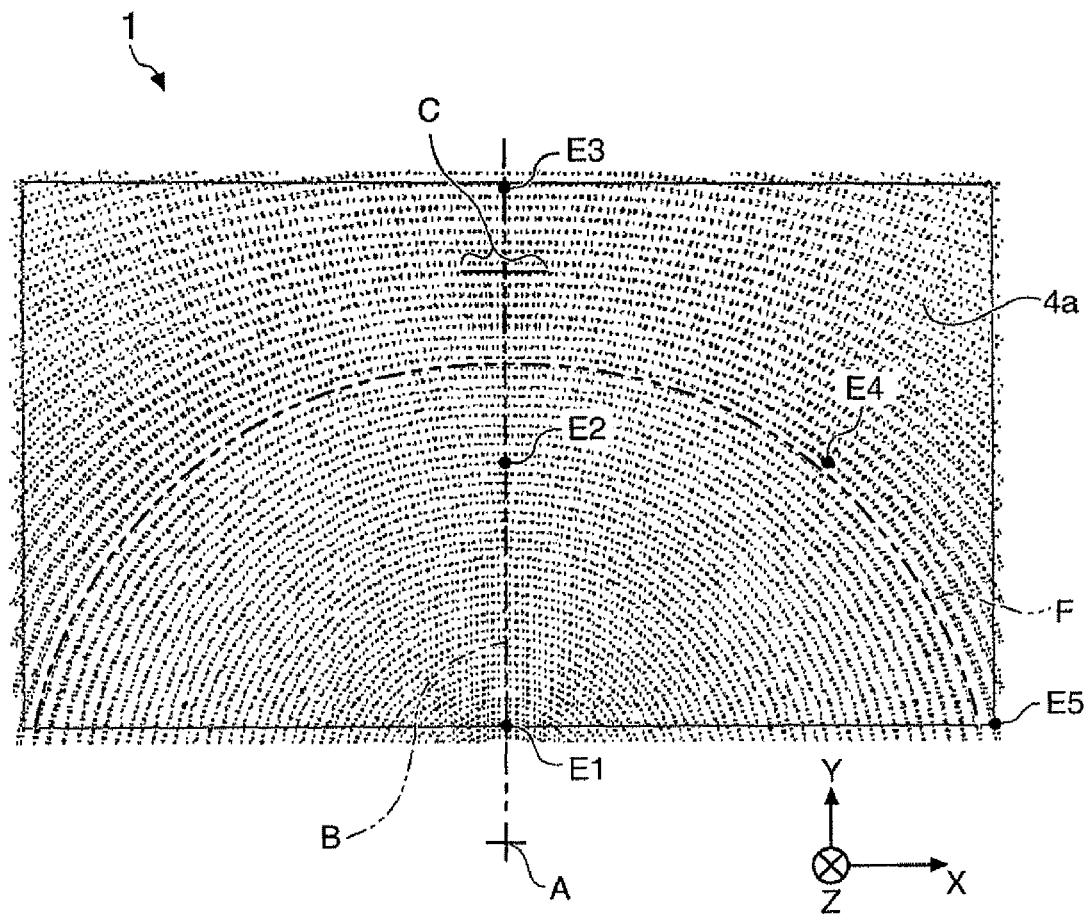
FIG. 2 diagrammatically shows a plan-view configuration of the screen viewed from a projector.

FIG. 1 diagrammatically shows a cross-sectional configuration of a screen according to a first embodiment of the invention. FIG. 2 diagrammatically shows a plan-view configuration of the screen 1 viewed from a projector 2. The screen 1 is a reflective screen that reflects projection light from the projector 2. The projector 2 is a front-projection projector that projects light according to an image signal. In the description of the embodiment of the present application, it is assumed that a Z axis is an axis along the optical axis of a projection system provided in the projector 2. It is also assumed that an X axis and a Y axis are perpendicular to each other and to the Z axis.

The screen 1 generally includes a substrate 4 and a light absorbing layer (absorber) 6. The substrate 4 is made of a transparent material that transmits light. A plurality of recesses 8 are densely formed on the surface of the substrate 4 on which the projection light from the projector 2 is incident (hereinafter referred to as a projection surface 4a). The projection surface 4a has a plurality of recesses 8 formed thereon, but the projection surface 4a as a whole can be considered as a flat surface. A reference point A is set in a plane extended from the projection surface 4a. The reference point A, which will be described later in detail, serves as a reference when the positions where the recesses 8 are formed on the projection surface 4a are determined. The reference point A is located at a point where the optical axis of the projection system provided in the projector 2 disposed in a preset position intersects the plane extended from the projection surface 4a. As apparent from the position of the reference point A, the projector 2 is disposed in an approximately central position of the screen 1 in the X-axis direction.

A reflection layer 8a (reflector) that reflects light is formed on the surface of each of the recesses 8 but only the portion on which the projection light from the projector 2 is incident. The reflection layer 8a formed on each of the recesses 8 reflects the projection light from the projector 2 toward a viewer. For example, if the projection surface 4a is formed of only a flat surface on which no recess 8 is formed, the angle of incidence and the angle of emergence with respect to the screen 1 is equal to each other. It is therefore difficult to reflect the projection light toward the viewer. However, forming the recesses 8 and shaping them into an appropriate concave surface allows the projection light to be reflected toward the viewer, whereby an excellent angular field of view can be provided. The reflection layers 8a are formed, for example, by applying a highly reflective white or silver paint onto the projection surface 4a.

The portion of each of the recesses 8 where no reflection layer 8a is formed transmits light in accordance with the characteristics of the substrate 4. That is, light incident on the screen 1 at an angle different from that of the projection light and incident on the portions other than the reflection layers 8a, for example, ambient light L2 from room lights, is not reflected off the screen 1 but exits through the surface on the opposite side to the projection surface 4a.

A plurality of points shown in FIG. 2 diagrammatically represent the recesses 8 formed on the projection surface 4a. As shown in FIG. 2, a plurality of recesses 8 are densely formed on the projection surface 4a in a two-dimensional manner. The recesses 8 are arranged on substantially concentric curved tracks around the reference point A. Examples of the "substantially concentric" curves used herein include not only two or more "circles" sharing the same center but also any of the shapes obtained by deforming a base "circle," for example, two or more "ellipses" or "free-form curves" sharing the same center or combinations of these curves. Further, combinations of the curve that forms an "ellipse" or a "free-form curve" with a straight line are also included. Each of the curved tracks in the present embodiment has a shape formed of a straight line that forms the portion within a certain range (a range C, for example) on both sides of a reference line B extending from the reference point A along the Y axis and part of an ellipse that forms each of the portions outside the range C.

The positions where the recesses 8 are formed will now be described. The positions where the recesses 8 are formed are determined based on not only the rule described above, that is, the recesses 8 are arranged on substantially concentric curved tracks described above, but also another certain rule.

Figure 3:
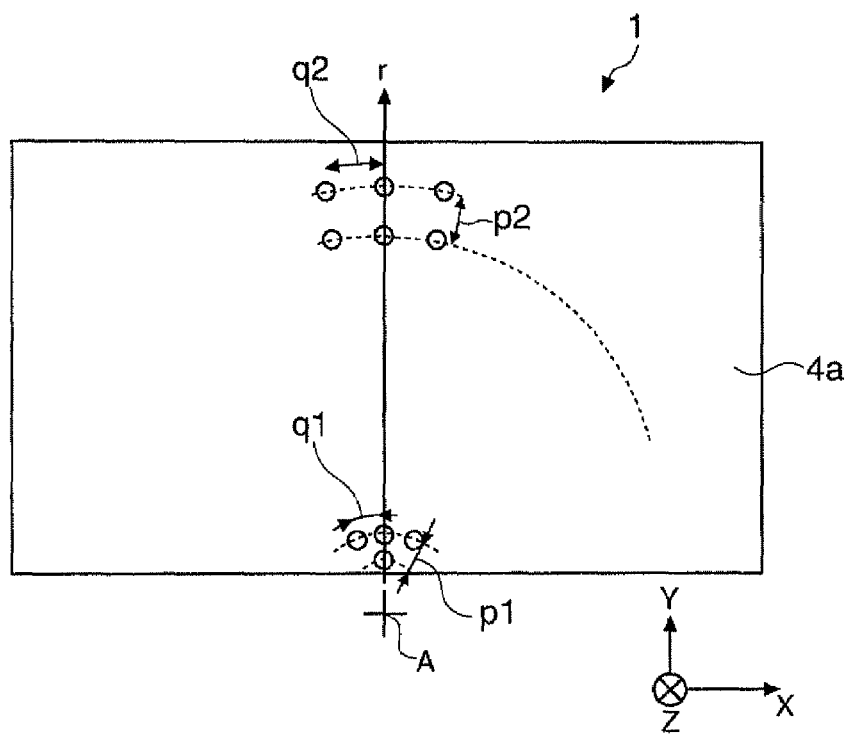
FIG. 3 is a front view of the screen and describes the positions where recesses are formed based on a distance r from a reference point A.

FIG. 3 is a front view of the screen 1 and describes the positions where the recesses 8 are formed based on the distance r from the reference point A. Although the recesses 8 are illustrated in such a way that they are spaced apart from each other for ease of description, the recesses 8 are, in practice, densely arranged so that they overlap with each other. The position of each of the recesses 8 on the projection surface 4a is defined by the angle θ between the reference line B and the straight line passing through the position of the recess 8 on the projection surface 4a and the reference point A, and the distance r from the reference point A to the position of the recess 8.

As apparent from FIG. 3, the recesses 8 are arranged in such a way that the spacing between recesses 8 adjacent in the radial direction from the reference point A (hereinafter simply referred to as a longitudinal spacing) increases with distance from the reference point A. That is, the longitudinal spacing p1 between adjacent recesses 8 formed in positions close to the reference point A is smaller than the longitudinal spacing p2 between adjacent recesses 8 formed in positions far away from the reference point A.

The recesses 8 are also arranged in such a way that the spacing between adjacent recesses 8 arranged on the same curved track (hereinafter simply referred to as a transverse spacing) increases with distance from the reference point A. That is, the transverse spacing q1 between adjacent recesses 8 formed in positions close to the reference point A is smaller than the transverse spacing q2 between adjacent recesses 8 formed in positions far away from the reference point A.

Figure 4:
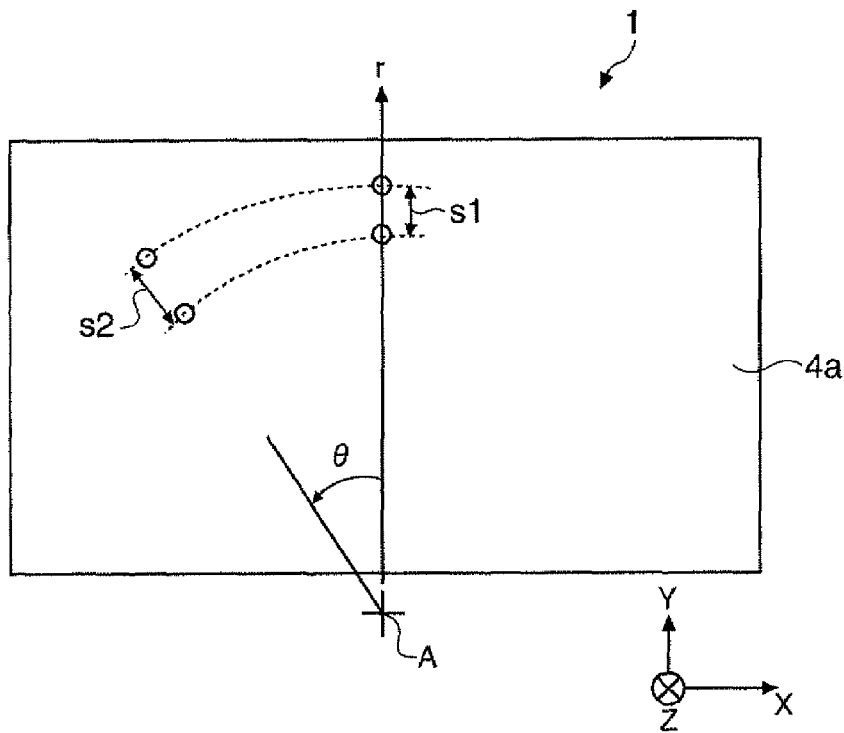
FIG. 4 is a front view of the screen and describes the positions where the recesses are formed based an angle θ.

FIG. 4 is a front view of the screen 1 and describes the positions where the recesses 8 are formed based the angle θ. Like FIG. 3, the recesses 8 are, in practice, densely arranged so that they overlap with each other. As apparent from FIG. 4, the recesses 8 are arranged in such a way that the longitudinal spacing between adjacent recesses 8 increases as the angle θ increases. That is, the longitudinal spacing s1 between adjacent recesses 8 formed in positions where the angle θ is small is smaller than the longitudinal spacing s2 between adjacent recesses 8 formed in positions where the angle θ is large.

Figure 5:
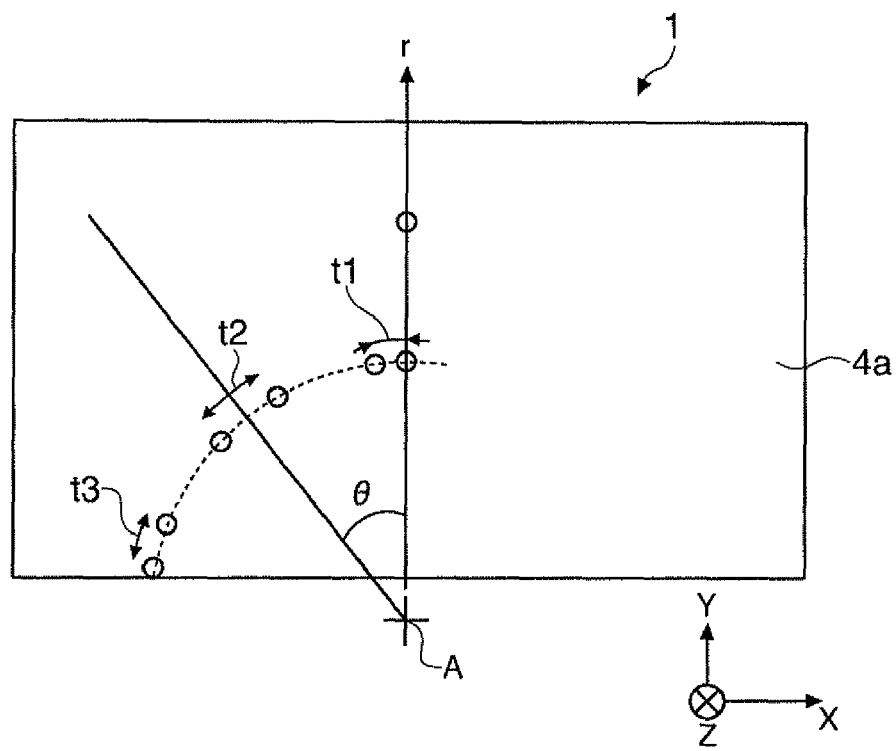
FIG. 5 is another front view of the screen and describes the positions where the recesses are formed based the angle θ.

FIG. 5 is another front view of the screen 1 and describes the positions where the recesses 8 are formed based the angle θ. Like FIG. 3, the recesses 8 are, in practice, densely arranged so that they overlap with each other. As apparent from FIG. 5, the recesses 8 are arranged in such a way that the transverse spacing between the adjacent recesses 8 formed in the positions where the angle θ is approximately 45 degrees is maximized and the transverse spacing between adjacent recesses 8 decreases as the angle θ increases and decreases from 45 degrees. That is, the transverse spacings t1 and t3 between the adjacent recesses 8 formed in positions where the angle θ is approximately 0 degrees and approximately 180 degrees are smaller than the transverse spacing t2 between the adjacent recesses 8 formed in the positions where the angle θ is approximately 45 degrees. It is noted that the angle θ where the transverse spacing is maximized is not limited to 45 degrees as shown in the present embodiment, but may vary in accordance with the size of the screen 1, the positional relationship between the screen 1 and the projector 2, and other factors.

Figure 6:
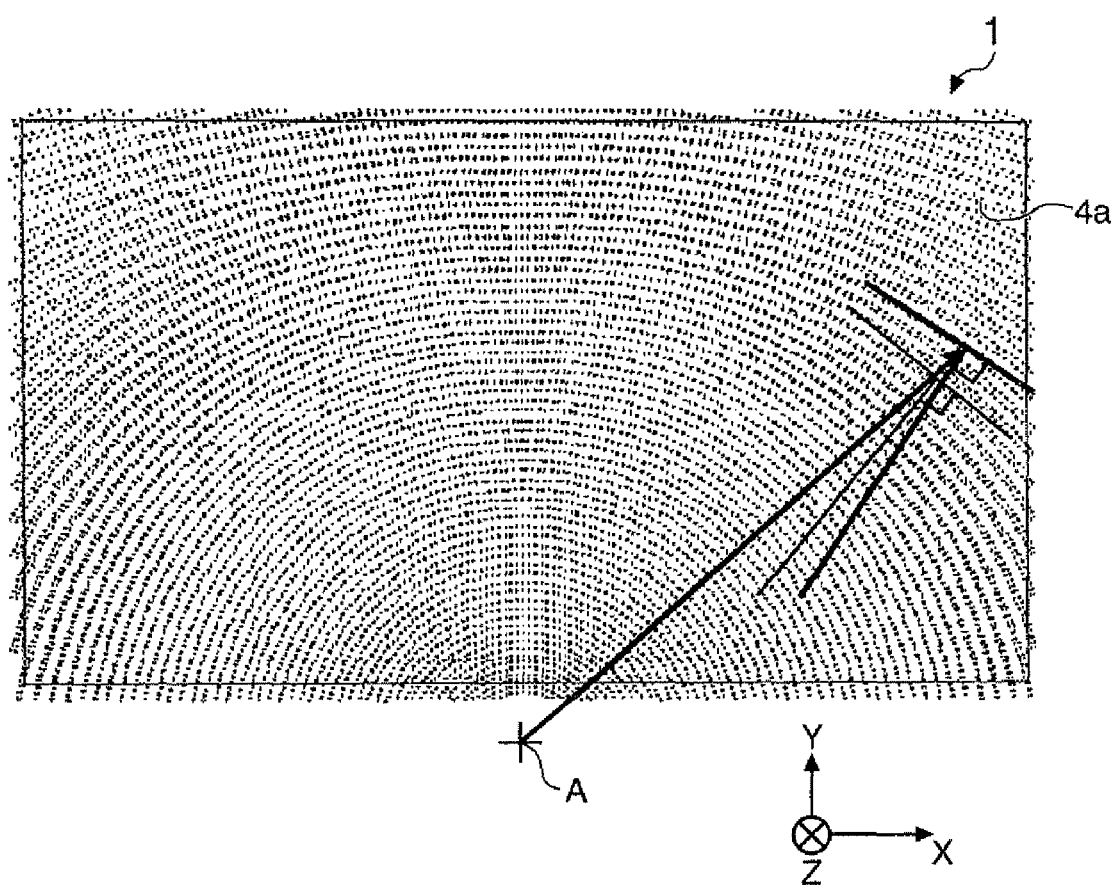
FIG. 6 describes why the transverse spacing between adjacent recesses is increased with distance from the reference point.

FIG. 6 describes why the transverse spacing between adjacent recesses 8 is increased with distance from the reference point A. The longitudinal spacings are increased as the angle θ increases, as described above. That is, the distance between adjacent curved tracks increases as the angle θ increases. The angle of the straight line passing through the reference point A and the central point of a recess 8 on a curved track differs from the angle of the line perpendicular to the tangential line to the curved track. The difference in the angle increases with distance from the reference point, that is, the difference for a recess 8 disposed on an outer curved track is greater than that for a recess 8 disposed on an inner curved track. As a result, a recess 8 disposed on an inner curved track and a recess 8 disposed on an outer curved track, even when these recesses 8 are disposed at points where the angle θ is the same, have different (shifted) suitable positions where the projection light from the projector 2 is reflected toward the viewer. That is, the reflection areas in these recesses that are required to provide a satisfactory angular field of view (required reflection positions) differs (shifts) from each other.

Figure 7:
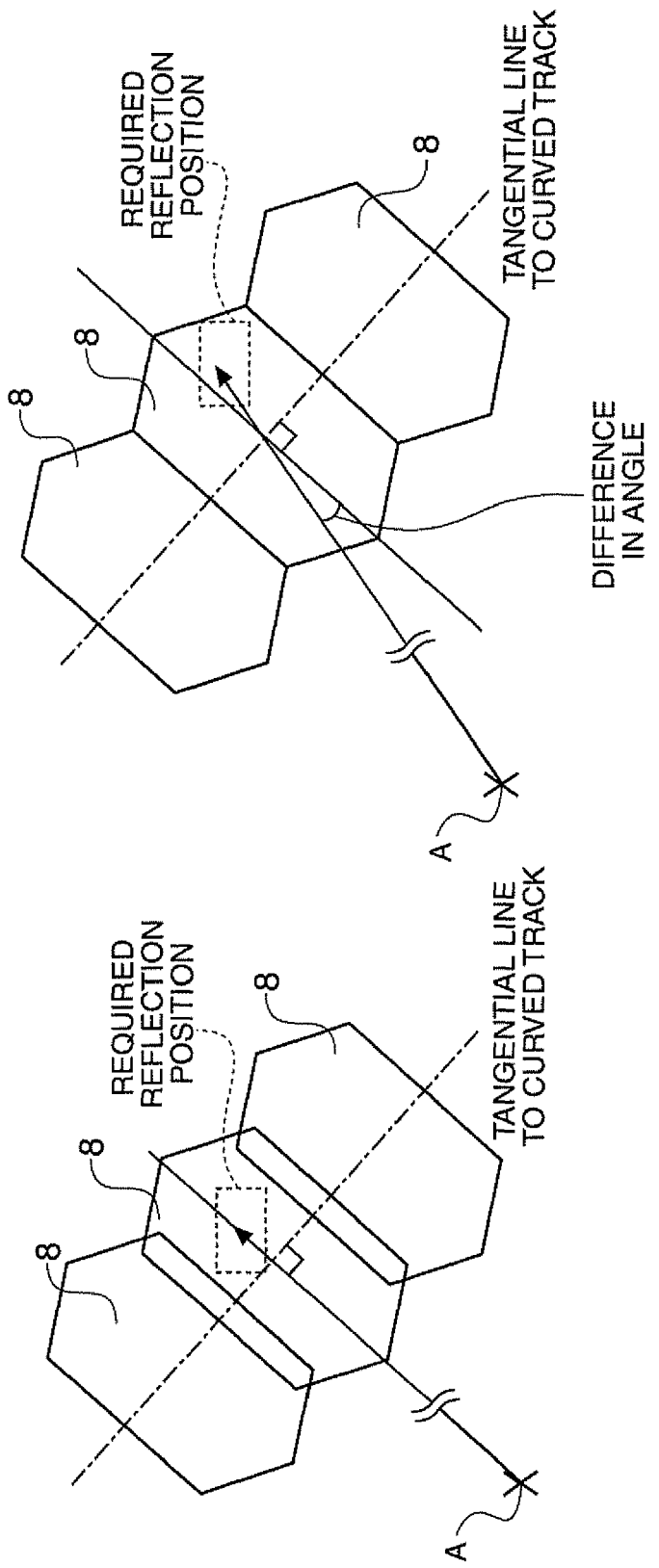
FIG. 7 describes the difference in a required reflection position.

FIG. 7 describes the difference in the required reflection position. The difference in the required reflection position on an outer concentric circle is greater than that for an inner concentric circle. That is, the required reflection position in a recess 8 shifts toward the edge thereof, and the amount of shift increases with distance from the reference point A. The amount of overlap between adjacent recesses 8 can be reduced by increasing the transverse spacing therebetween with distance from the reference point A, whereby the space for the required reflection position shifted toward the edge of each of the adjacent recesses 8 can be provided. From the same reason, the required reflection position also shifts as the angle θ changes. The amount of shift is maximized when the angle θ is approximately 45 degrees. Therefore, the recesses 8 are arranged in the present embodiment in such a way that the transverse spacing between the adjacent recesses 8 in the positions where the angle θ is approximately 45 degrees is maximized.

FIGS. 8 to 12 are partial enlarged views in the following positions on the screen 1. In the following description, a reference character "V" represents the longitudinal spacing, and a reference character "H" represents the transverse spacing. The hatched area shows the shapes of the recesses 8 formed in the actual screen 1. Similar shapes, although omitted in the figures, are successively formed around the hatched area.

Figure 8:
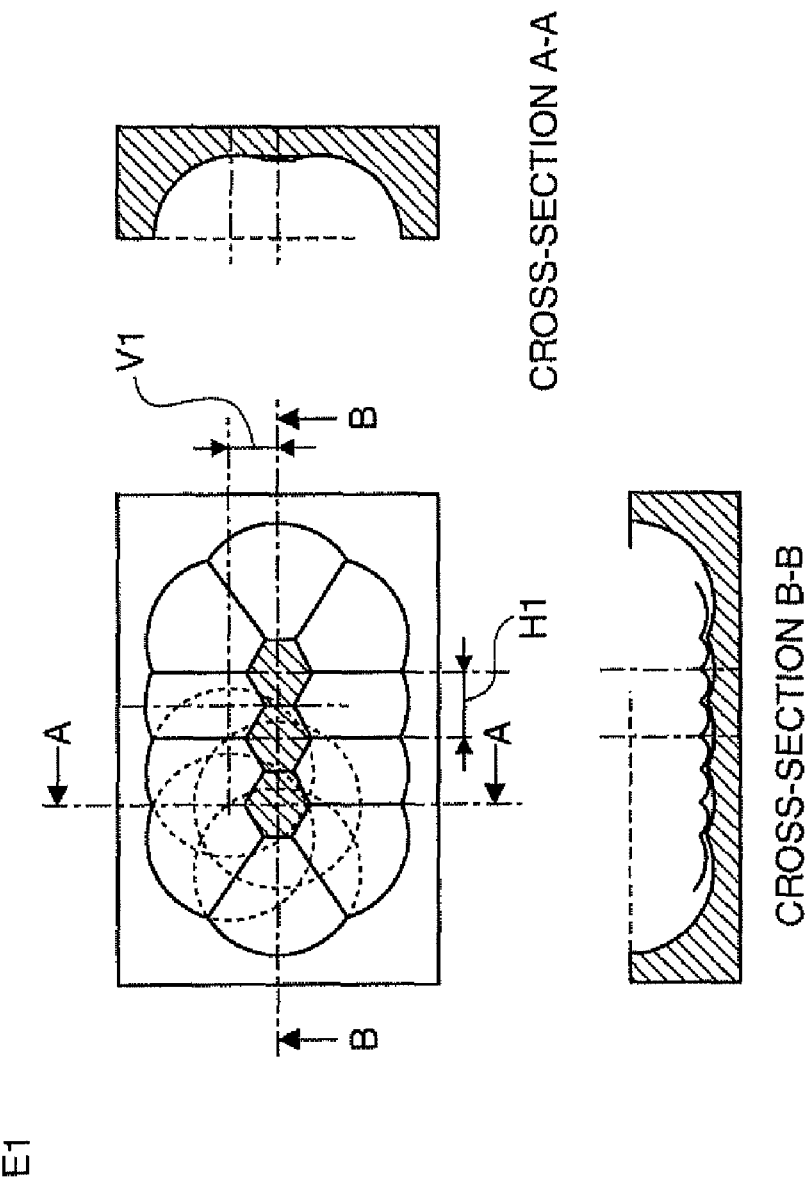
FIG. 8 is a partial enlarged view showing in detail the recesses formed at a point E1 in FIG. 2.
Figure 9:
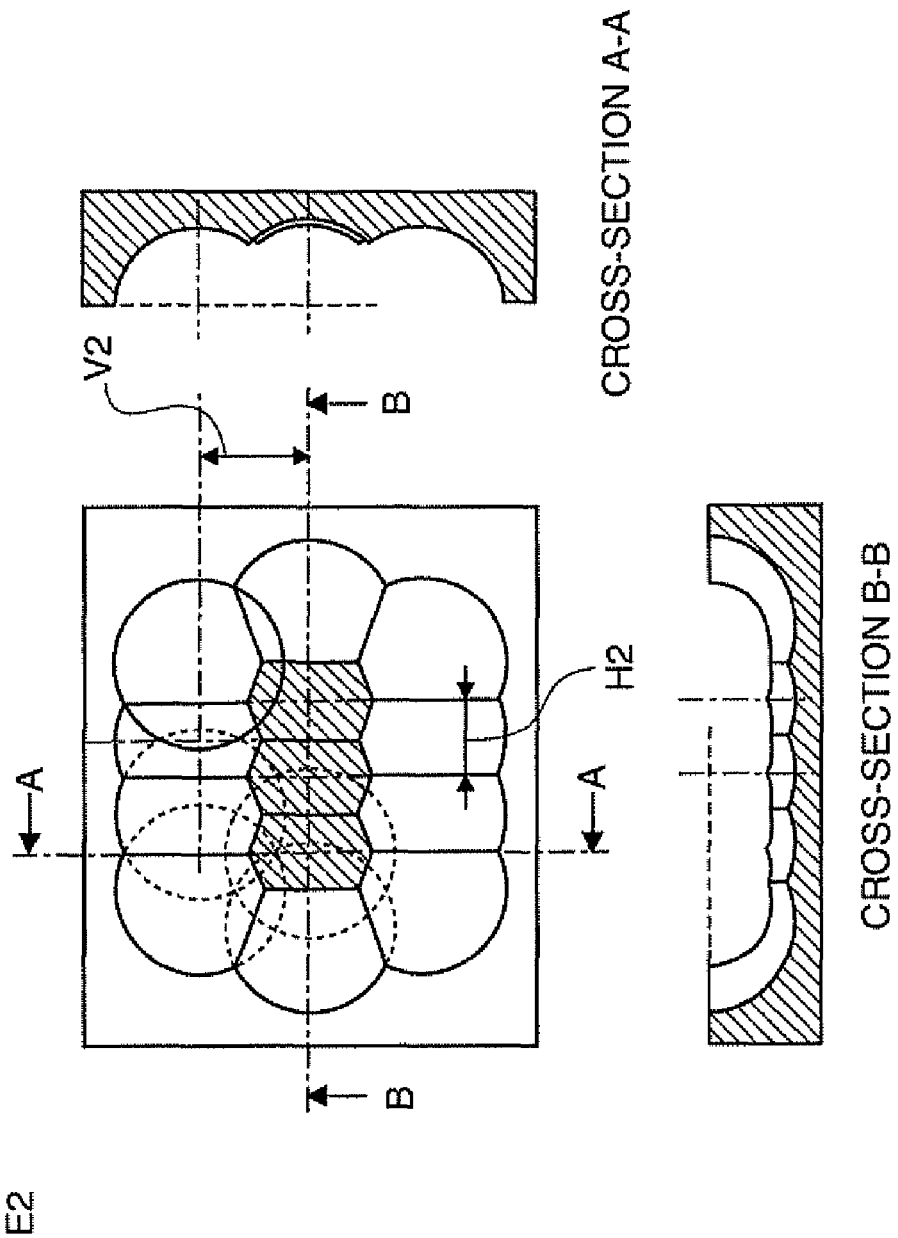
FIG. 9 is a partial enlarged view showing in detail the recesses formed at a point E2 in FIG. 2.
Figure 10:
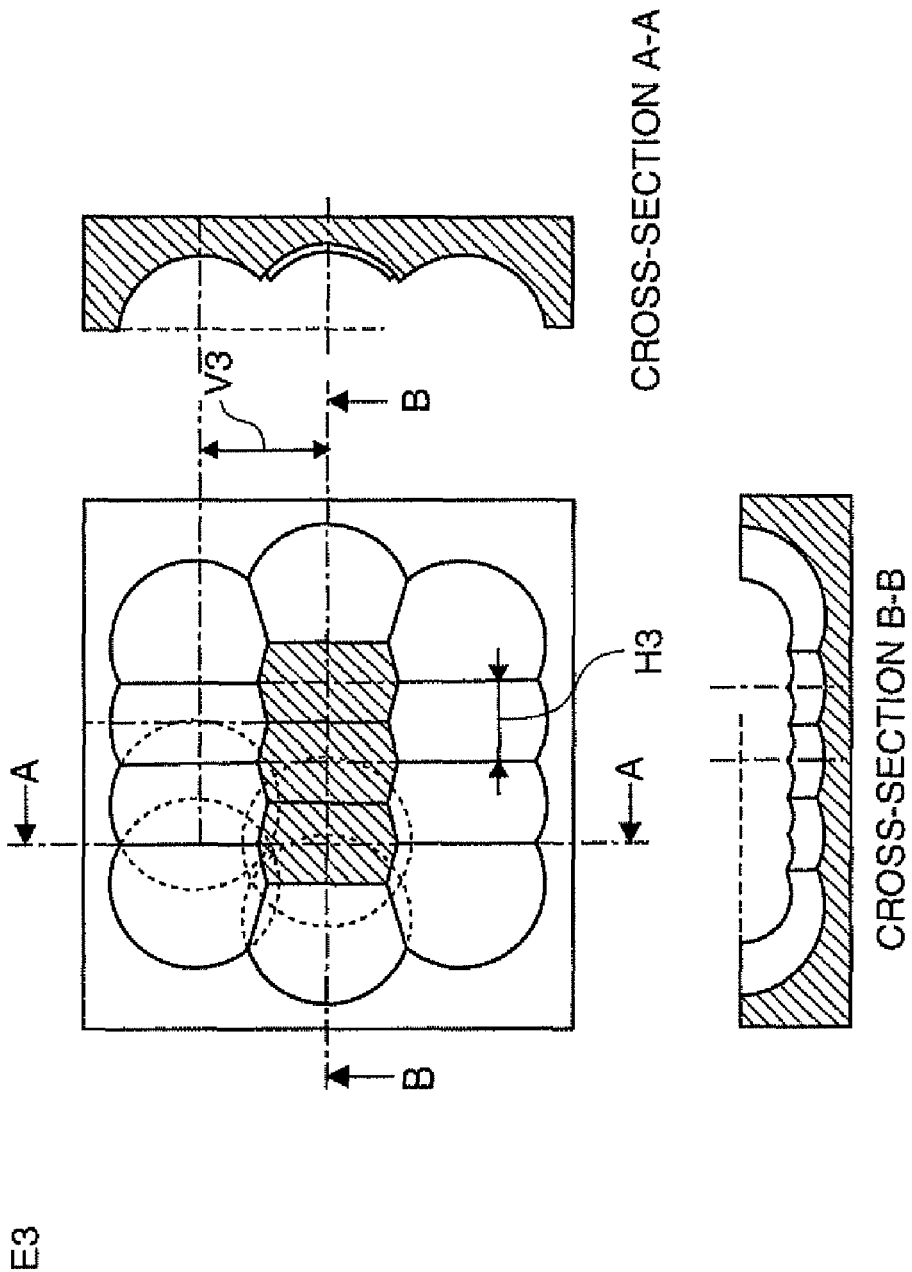
FIG. 10 is a partial enlarged view showing in detail the recesses formed at a point E3 in FIG. 2.

FIG. 8 is a partial enlarged view showing in detail the recesses 8 formed at a point E1 in FIG. 2. A plurality of recesses 8 are densely arranged in such a way that they overlap each other. At the point E1, the longitudinal spacing is V1 and the transverse spacing is H1. FIG. 9 is a partial enlarged view showing in detail the recesses 8 formed at a point E2 in FIG. 2. At the point E2, the longitudinal spacing is V2 and the transverse spacing is H2. FIG. 10 is a partial enlarged view showing in detail the recesses 8 formed at a point E3 in FIG. 2. At the point E3, the longitudinal spacing is V3 and the transverse spacing is H3.

Figure 11:
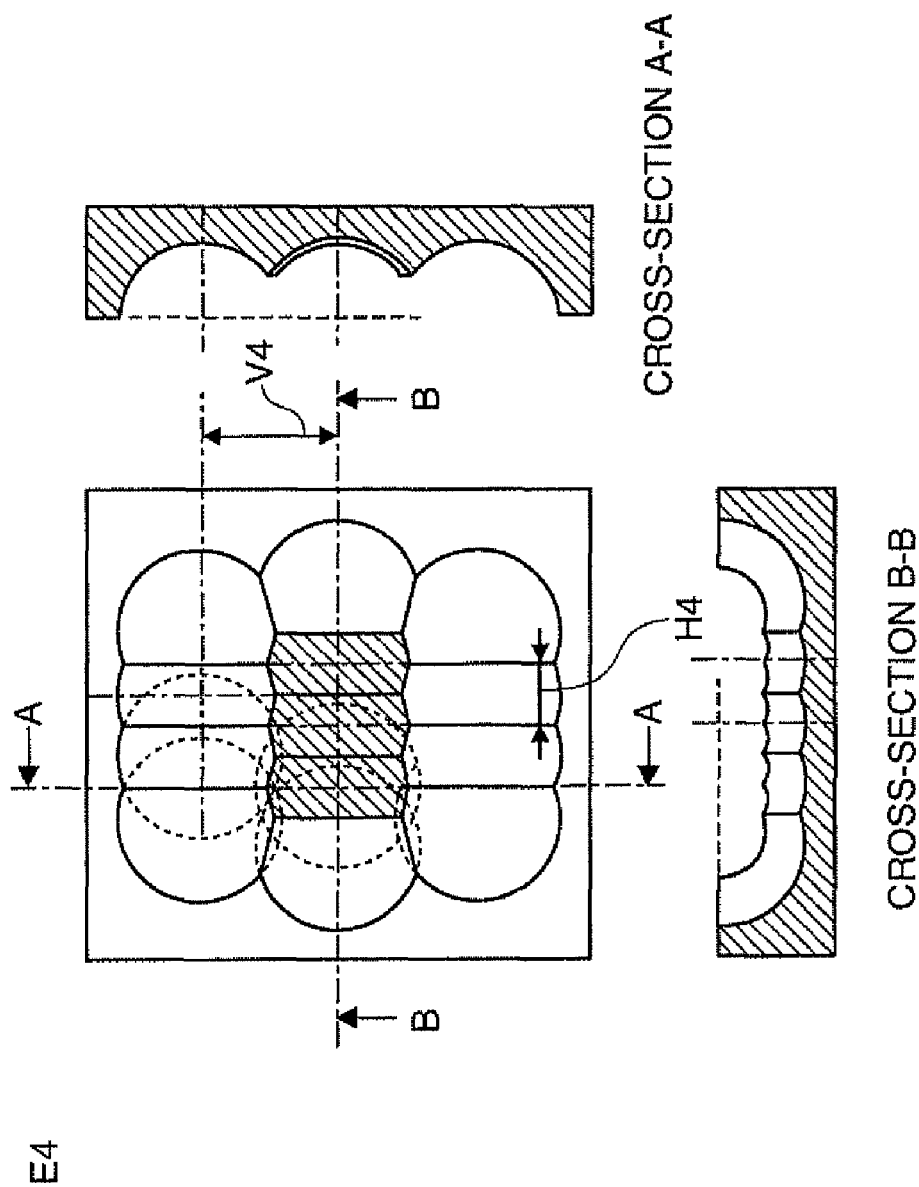
FIG. 11 is a partial enlarged view showing in detail the recesses formed at a point E4 in FIG. 2.
Figure 12:
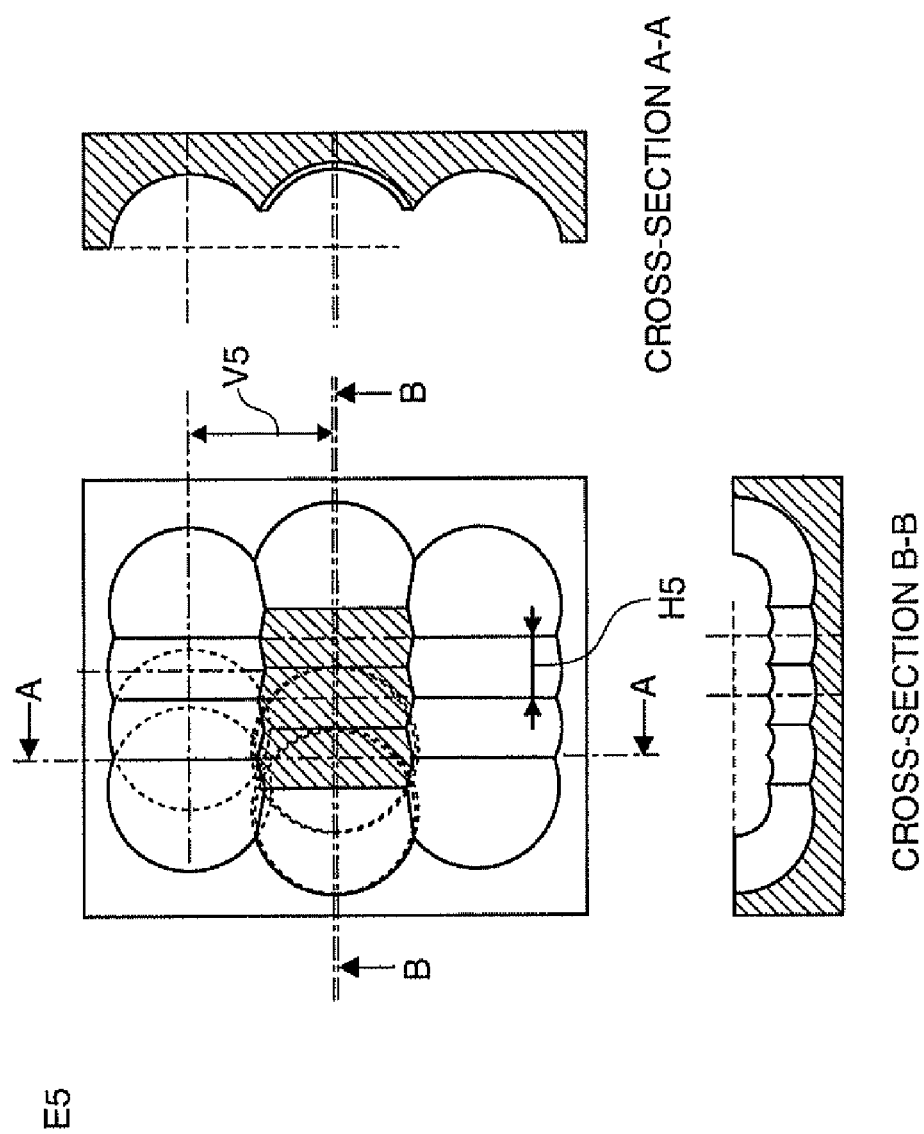
FIG. 12 is a partial enlarged view showing in detail the recesses formed at a point E5 in FIG. 2.

FIG. 11 is a partial enlarged view showing in detail the recesses 8 formed at a point E4 in FIG. 2. Since these recesses 8 are arranged on a curved track, the actual arrangement of the recesses 8 is obtained by rotating the arrangement shown in FIG. 11 approximately 38 degrees clockwise. At the point E4, the longitudinal spacing is V4 and the transverse spacing is H4. FIG. 12 is a partial enlarged view showing in detail the recesses 8 formed at a point E5 in FIG. 2. From the same reason as that described for the point E4, the actual arrangement of the recesses 8 is obtained by rotating the arrangement shown in FIG. 12 approximately 78 degrees clockwise. At the point E5, the longitudinal spacing is V5 and the transverse spacing is H5.

The distances r from the reference point A to the points E1, E2, and E3 are set in such a way that the following equation is satisfied: the distance r to the point E1< the distance r to the point E2< the distance r to the point E3. The longitudinal spacings V1, V2, and V3 at the points E1, E2, and E3 therefore satisfy the following equation: V1<V2<V3. Further, the transverse spacings H1, H2, and H3 at the points E1, E2, and E3 satisfy the following equation: H1<H2<H3. The angles θ at the points E2, E4, and E5 satisfy the following equation: the angle θ at the point E2< the angle θ at the point E4< the angle θ at the point E5. The longitudinal spacings V2, V4 and V5 at the points E2, E4, and E5 therefore satisfy the following equation: V2<V4<V5. The angle θ at the point E4 is approximately 45 degrees, which is greater than the angle θ at the point E2 but smaller than the angle θ at the point E5. Therefore, the transverse spacings H2, H4, and H5 at the points E2, E4, and E5 satisfy the following equations: H2<H4 and H5<H4, which means that H4 is the greatest of all.

Figure 13:
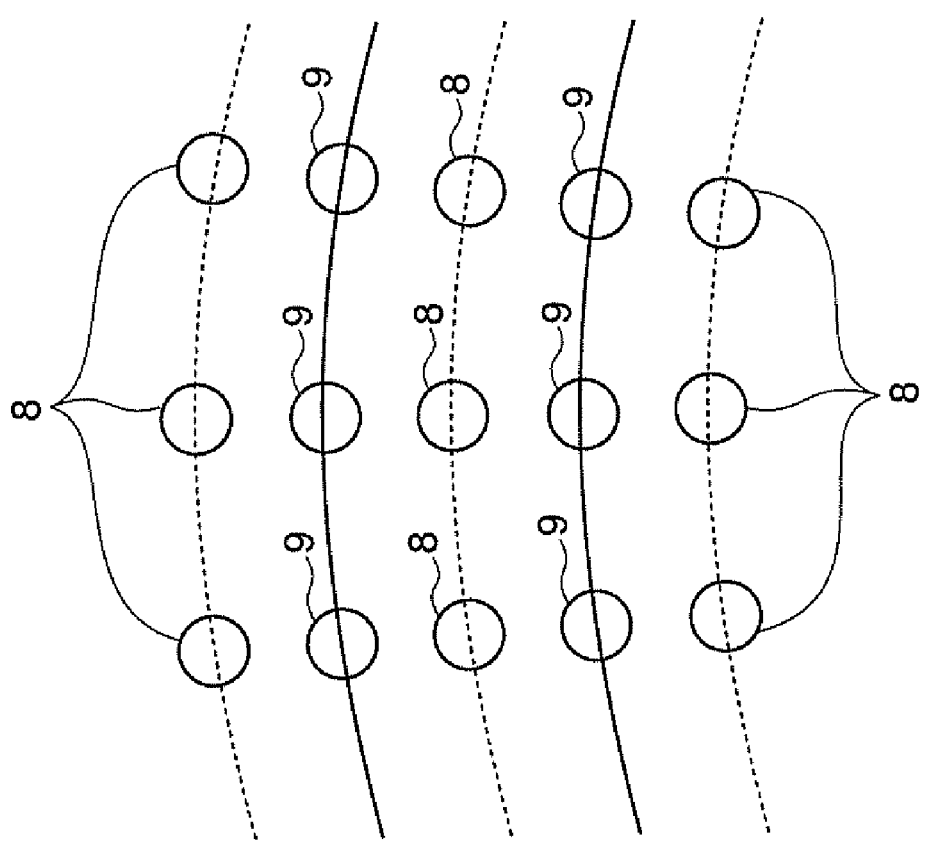
FIG. 13 shows a state in which additional concave recesses are formed between adjacent curved tracks.
Figure 14:
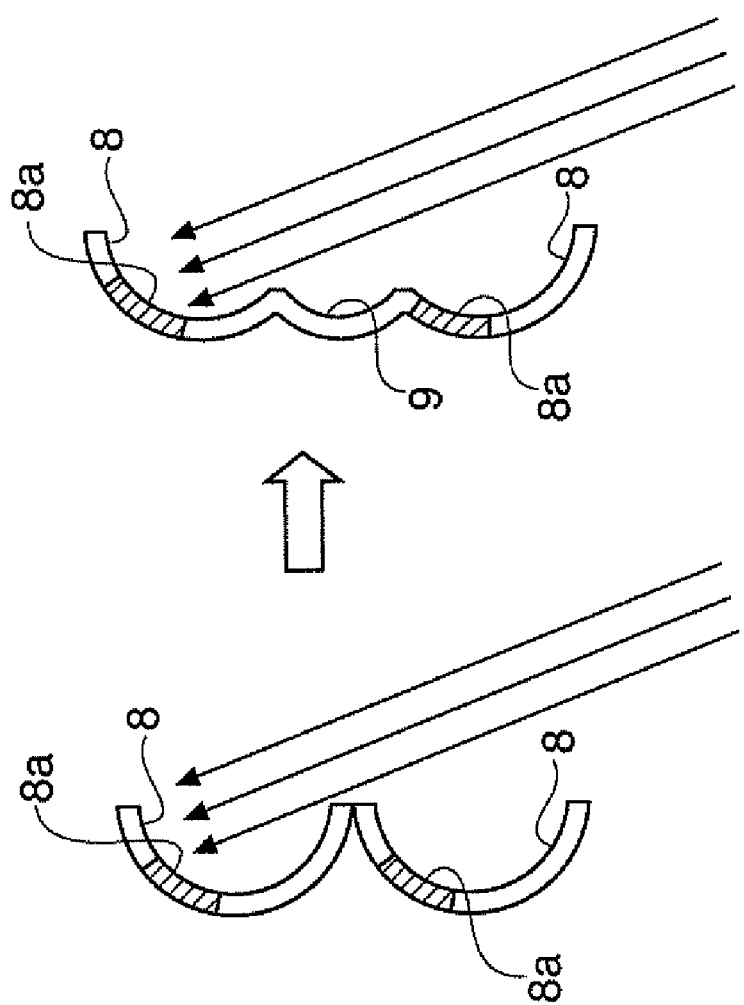
FIG. 14 is a partial cross-sectional view for comparing a case where no additional recess is formed with a case where additional recesses are formed.

FIG. 13 shows a state in which additional concave recesses 9 are formed between adjacent curved tracks and the longitudinal spacings are halved or further smaller. FIG. 14 is a partial cross-sectional view for comparing a case where no additional recess 9 is formed with a case where the additional recesses 9 are formed. When no additional recess 9 is formed, the concave shapes of adjacent recesses 8 form a wall, which may block the projection light incident on the corresponding reflection layer 8a in some cases. In particular, since the angle of incidence of the projection light with respect to the screen 1 is large in the area of the projection surface 4a that is far away from the reference point A, the wall formed by the concave shapes of adjacent recesses 8 likely blocks the projection light.

However, since the additional recesses 9 are formed between adjacent curved tracks, no projection light blocking wall is formed, and the projection light can be brought onto the reflection layers 8a of the recesses 8 formed in positions far away from the reference point A. In the present embodiment, the additional recesses 9 are formed in the area that is away from the reference point A beyond the boundary F shown in FIG. 2. For example, the area that is away from the reference point A beyond the boundary F is an area where the angle of incidence of the projection light with respect to the screen 1 is 60 degrees or greater.

Figure 15:
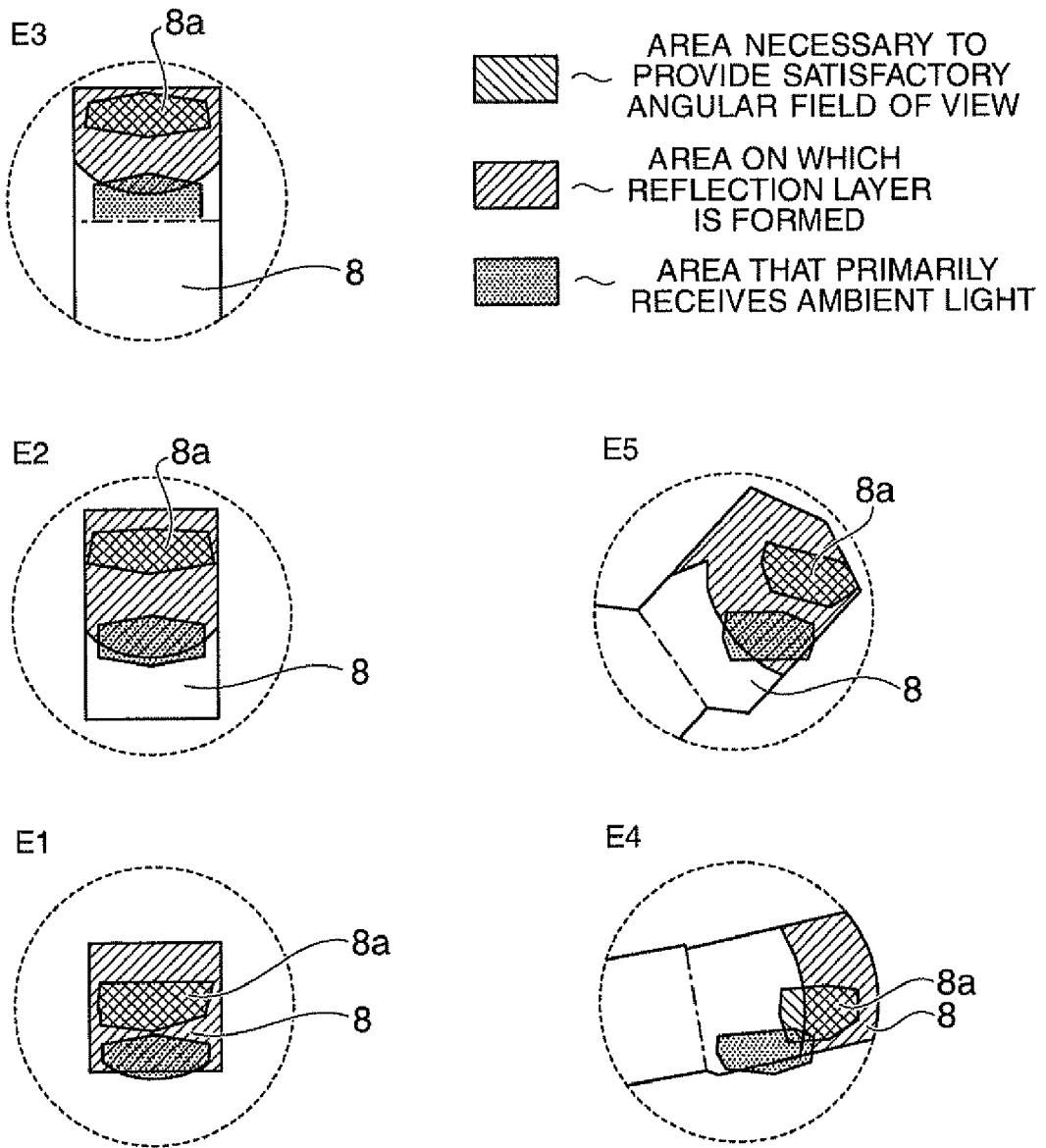
FIG. 15 describes, for example, the projection light incident position on the recess at each point shown in FIG. 2 on the screen.

FIG. 15 describes, for example, the projection light incident position on the recess 8 at each of the points shown in FIG. 2 on the screen 1. As shown in FIG. 15, the reflection layer 8a is formed in an area of the recess 8 that needs to reflect the projection light toward the viewer to provide a satisfactory angular field of view. On the other hand, no reflection layer 8a is formed on part of the portion on which illumination light or other ambient light is incident, and part of the ambient light is not reflected toward the viewer but passes through the substrate 4. As a result, the amount of reflection of the ambient light can be reduced, and a high-contrast image can be provided to the viewer.

The light absorbing layer 6 is provided on the opposite side of the substrate 4 to the projection surface 4a. The light absorbing layer 6 has a property of absorbing the incident light. As a result, the light absorbing layer 6 absorbs the ambient light that is incident on the area of each of the recesses 8 where no reflection layer 8a is formed and passes through the substrate 4, whereby the amount of reflection of the ambient light can be further reduced and a higher-contrast image can be provided to the viewer. Even when no light absorbing layer 6 is provided, the same advantageous effect can be provided by surface-treating the area of each of the recesses 8 where no reflection layer 8a is formed so that the surface-treated area absorbs light. That is, any means can be employed as long as the area of each of the recesses 8 where no reflection layer 8a is formed can absorb light incident thereon.

As described above, in the screen 1 according to the present embodiment, since the recesses 8 are more densely arranged in areas closer to the reference point A, and the longitudinal spacing between adjacent recesses 8 increases with distance from the reference point A, the projection light can efficiently travel toward an area in front of the screen 1. As a result, light having an appropriate angular distribution can efficiently travel in an area in front of the screen, whereby a high-brightness, high-contrast image can be provided.

Further, since the longitudinal spacing between adjacent recesses 8 increases as the angle θ increases, the projection light can efficiently travel toward an area in front of the screen 1. Moreover, since the transverse spacing between adjacent recesses 8 increases with distance from the reference point A, an excellent characteristic of the angular field of view can be provided. An excellent characteristic of the angular field of view can also be provided by increasing the transverse spacing between the recesses 8 in the positions where the angle θ is approximately 45 degrees. Moreover, in positions where light is incident at a large angle of incidence with respect to the screen 1 (the area that is far away from the reference point A beyond the boundary F in the embodiment), further providing the additional recesses 9 between adjacent curved tracks allows the light to be incident on the reflection area in each of the recesses 8 that is required to provide a satisfactory angular field of view.

Figure 16:
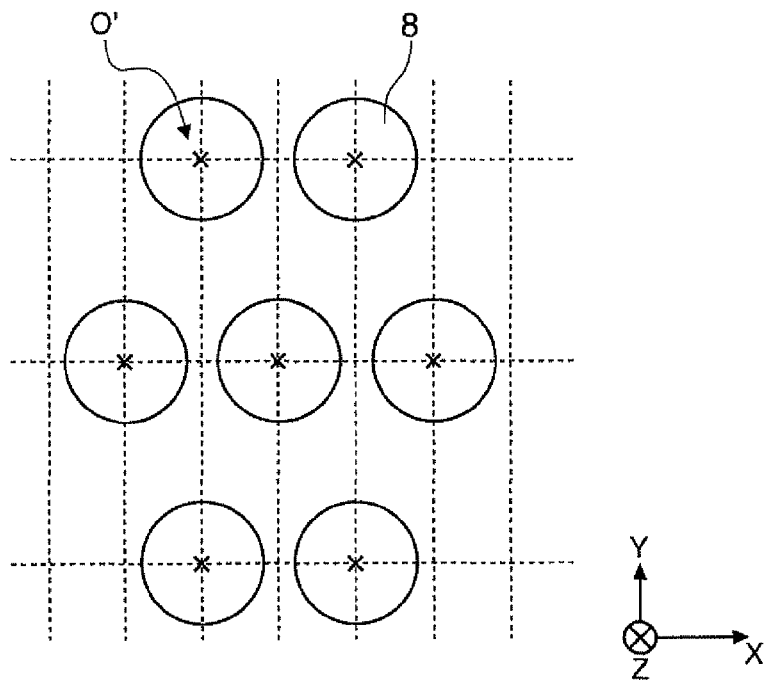
FIG. 16 describes recesses in a comparative example of the present embodiment.

FIG. 16 describes the arrangement of the recesses 8 in a comparative example to be compared with the present embodiment. Let O' be the central position of each of the recesses 8 in the comparative example. The recesses 8 in the comparative example are arranged based on the certain rule described in the above embodiment in such a way that the spacing changes. Looking at adjacent recesses 8, however, one can consider that the change in the spacing is very small and the recesses 8 are arranged at fixed longitudinal and transverse spacings. When the recesses 8 are thus regularly arranged, a moire pattern is noticeable due to diffraction of the light. Further, the moire pattern becomes clearer as the reflectance of the screen 1 increases.

Figure 17:
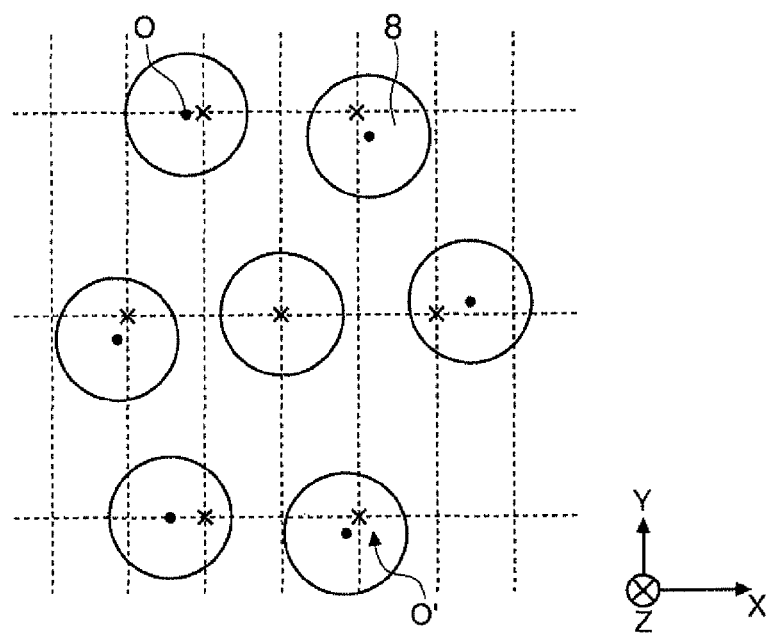
FIG. 17 is a partial enlarged view and describes the arrangement of the recesses in a variation of the present embodiment.

FIG. 17 is a partial enlarged view and describes the arrangement of the recesses 8 in a variation of the present embodiment. In the present variation, the longitudinal and transverse spacings between the recesses 8 irregularly change, unlike the comparative example described above. In the present variation, the recesses 8 are formed by shifting them from their centers O' based on which the recesses 8 area regularly arranged in accordance with the certain rule described above by the length that is one-half or smaller than the spacing between the centers O'. That is, the center O' of each of the recesses 8 in the present variation is shifted from the corresponding center O' by the length that is one-half or smaller than the spacing between the centers O'. As a result, irregularly arranging the recesses 8 can prevent a moire pattern and hence reduction in image quality. The reason why the amount of shift of the center O is one-half or smaller than the spacing is to prevent a situation in which a large amount of shift larger than one-half the spacing causes adjacent recesses 8 to overlap each other or the positions where adjacent recesses 8 are formed to be reversed.

In the present embodiment, the optical axis of the projection system provided in the projector 2 coincides with the reference point A, but the projector 2 is not necessarily disposed in this manner. That is, any layout may be employed as long as the angle of incidence of the projection light with respect to the screen 1 increases with distance from the reference point A. For example, when the reference point A is located in a position spaced apart from the screen 1 as shown in the present embodiment, the conditions of the angle of incidence of the projection light described above can be satisfied even when the optical axis of the projection system does not coincide with the reference point A by employing a configuration in which the optical axis of the projection system intersects the reference line B (except the reference line B on the opposite side of the screen 1 to the reference point A).

As described above, the screen according to the embodiment of the invention is useful for a case where presentation or video images are displayed, in particular, suitable for a case where an image projected from a projector is displayed.

The entire disclosure of Japanese Patent Application No. 2008-266030, filed Oct. 15, 2008 is expressly incorporated by reference herein.

What is claimed is:

1. A screen comprising
a plurality of concave recesses arranged on a flat surface,
wherein the recesses are arranged in such a way that the spacing between adjacent ones of the recesses in the radial direction from a reference point located in the flat surface or a plane extended from the flat surface increase with distance from the reference point.

2. The screen according to claim 1,
wherein when a position on the flat surface is defined by the angle between a reference line passing through the reference point and the central point of the flat surface and a straight line passing through the reference point and the position, the recesses are arranged in such a way that the spacing between adjacent ones of the recesses in the radial direction increases as the angle increases.

3. The screen according to claim 1,
wherein the recesses are arranged on substantially concentric curved tracks around the reference point, and
the recesses are arranged with the distance between the curved tracks increasing with distance from the reference point.

4. The screen according to claim 2,
wherein the recesses are arranged on substantially concentric curved tracks around the reference point, and
the recesses are arranged with the distance between the curved tracks increasing with distance from the reference point.

5. The screen according to claim 3,
wherein the recesses are arranged in such a way that the spacing between adjacent ones of the recesses in the direction in which each of the curved tracks extends increases with distance from the reference point.

6. The screen according to claim 4,
wherein the recesses are arranged in such a way that the spacing between adjacent ones of the recesses in the direction in which each of the curved tracks extends increases with distance from the reference point.

7. The screen according to claim 3,
wherein when a position on the flat surface is defined by the angle between a reference line passing through the reference point and the central point of the flat surface and a straight line passing through the reference point and the position, the recesses are arranged in such a way that the spacing between adjacent ones of the recesses in the direction in which each of the curved tracks extends changes with the angle in order to provide an area in each of the recesses that is required to provide a satisfactory angular field of view.

8. The screen according to claim 4,
wherein when a position on the flat surface is defined by the angle between a reference line passing through the reference point and the central point of the flat surface and a straight line passing through the reference point and the position, the recesses are arranged in such a way that the spacing between adjacent ones of the recesses in the direction in which each of the curved tracks extends changes with the angle in order to provide an area in each of the recesses that is required to provide a satisfactory angular field of view.

9. The screen according to claim 5,
wherein the recesses are arranged in such a way that the spacing in the direction in which each of the curved tracks extends between the recesses in the position where the angle is approximately 45 degrees is maximized.

10. The screen according to claim 3,
wherein additional ones of the recesses are provided between the curved tracks on part of the flat surface.

11. The screen according to claim 3,
wherein the central position of each of the recesses irregularly changes from a predetermined reference position in at least one of the radial direction and the direction in which each of the curved tracks extends by the length one-half or smaller than the spacing at which the recesses are arranged.

12. The screen according to claim 4,
wherein additional ones of the recesses are provided between the curved tracks on part of the flat surface.

13. The screen according to claim 4,
wherein the central position of each of the recesses irregularly changes from a predetermined reference position in at least one of the radial direction and the direction in which each of the curved tracks extends by the length one-half or smaller than the spacing at which the recesses are arranged.

14. The screen according to claim 1,
further comprising a reflection portion that reflects light,
wherein when projection light is projected under the condition that the optical axis of a projection system substantially coincides with the reference point, the reflection portion is formed on each of the recesses but only in the position on which the projection light is incident.

15. The screen according to claim 14,
further comprising an absorbing portion that absorbs light incident on the portion of each of the recesses where no reflection portion is formed.

16. The screen according to claim 1,
wherein the recesses are densely arranged in such a way that the recesses overlap with each other.

17. The screen according to claim 1,
wherein the screen can be disposed with respect to a projector disposed in a preset position in such a way that the reference point is set in a position where the optical axis of a projection system provided in the projector intersects the flat surface or a plane extended from the flat surface.

18. The screen according to claim 1,
wherein the screen is a screen that reflects projected light, and
each of the recesses has a concave shape facing the direction in which the light is incident or reflected.

* * * * *